(12) United States Patent
Letovsky

(10) Patent No.: US 8,619,359 B2
(45) Date of Patent: Dec. 31, 2013

(54) ELECTRONIC MICROSCOPE FILTER

(76) Inventor: Howard Letovsky, Willits, CA (US)

( * ) Notice: Subject to any disclaimer, the term of this patent is extended or adjusted under 35 U.S.C. 154(b) by 300 days.

(21) Appl. No.: 13/095,151

(22) Filed: Apr. 27, 2011

(65) Prior Publication Data

US 2012/0275019 A1    Nov. 1, 2012

(51) Int. Cl.
*G02B 21/06* (2006.01)

(52) U.S. Cl.
CPC .................................... *G02B 21/06* (2013.01)
USPC .......................................... 359/385; 359/579

(58) Field of Classification Search
None
See application file for complete search history.

(56) References Cited

U.S. PATENT DOCUMENTS

| | | | |
|---|---|---|---|
| 6,587,575 B1* | 7/2003 | Windham et al. | 382/110 |
| 7,081,954 B2* | 7/2006 | Sandstrom | 356/317 |
| 7,423,750 B2* | 9/2008 | Hoshizaki et al. | 356/317 |
| 7,532,323 B2* | 5/2009 | Tang et al. | 356/317 |
| 2005/0270639 A1* | 12/2005 | Miki | 359/381 |
| 2009/0201577 A1* | 8/2009 | LaPlante et al. | 359/355 |

* cited by examiner

*Primary Examiner* — Derek S Chapel

(57) ABSTRACT

The present invention discloses a unique and novel combination light source and active light filtering system for microscopes that eliminates the need for individual color filters, fluorescence filters, and many other filter types. The present invention provides variable light wavelength generating capabilities, and all of the benefits of most commercially available light sources in a compact package that can be mounted on a microscope or used at a distance from a microscope, but be coupled to it through a fiber optic cable or other light transmission means. Additionally, the present invention eliminates the need for a filter wheel turret in a microscope's optical path, as well as eliminates the need for multiple fluorescent filter blocks in a fluorescent microscope optical path. The present invention can improve microscope filter systems to enable effective imaging of live cells without staining.

4 Claims, 2 Drawing Sheets

ELECTRONIC MICROSCOPE FILTER

FIELD OF THE INVENTION

The present invention relates to filters used to modify the wavelengths of light applied to specimens on microscopes.

BRIEF DESCRIPTION OF PRIOR ART

Most high quality research grade microscopes use one or more separate filters to modify the light emitted from a light source directed at a specimen placed in the optical path of said microscope. These filters may be phase contrast, fluorescent, prism, band pass, dichroic, or simple colored gels used to block or allow the transmission of certain wavelengths of light. In all cases of prior art, the filters are passive devices. Further, said light sources aimed at said filters may be mercury vapor, halogen, LED, laser, or any other type of visible and invisible light sources.

Prior art discloses myriad types and styles of the aforementioned filters and light sources. However, in all cases of prior art, each filter is manufactured as a separate component intended to be inserted in a carrier in a microscope system and is designed to effect only one very specific wavelength—or a very narrow area of specific wavelengths—of light. Because of this limitation, a microscope can typically hold just a few filters in its optical path system. Often, these filters are provided in a rotating turret configuration. Also, each light source type has very specific and limited wavelength characteristics.

There is extensive prior art disclosing video projectors that use various types of translucent display panels driven by video generator hardware, a light source, and a lens to provide enlarged video images.

For many years, in DLP (digital light processing), LCD (liquid crystal display), or LCOS (liquid crystal on silicon) video projectors, colors were produced either with multiple DLP, LCD, or LCOS panels, or in a single DLP panel system, by placing a color wheel between a white lamp and the DLP chip. In state of the art video projectors, multi-color RGB (red, green, blue), RGBW (red, green, blue, white), or LED (light emitting diode) and laser illuminated single-chip projectors are able to eliminate the spinning wheel and provide a wide array of colors needed.

No video projection system was ever intended to be interfaced to microscopes. However, the present invention takes advantage of the current state of the art in RGB and RGBW LED, RGB laser technology, and other emerging multi-color light source systems in a unique and novel system design to provide variable intensity, variable wavelength light source and active light filtering functions for microscopes.

BRIEF SUMMARY OF THE INVENTION

The present invention discloses a unique and novel combination light source and light filtering system for microscopes that provides an active filter set of almost unlimited light wavelength generation and modification capabilities, as well as providing all of the benefits of most commercially available microscope light sources in a compact package that can be mounted on a microscope or used at a distance from a microscope yet be coupled to it through a fiber optic cable or other light transmission means. Additionally, the present invention can eliminate the need for a filter wheel turret in a microscope's optical path, as well as eliminate the need for multiple fluorescent filter blocks in a fluorescent microscope system.

In the preferred embodiment of the present invention components are combined from several unrelated industries to improve the state of the art in microscopic specimen analysis. In the preferred embodiment, a single RGB (red, green, blue) or RGBW (red, green, blue, and white) LED (light emitting diode) panel, a multi-color laser panel, or an equivalent variable color, variable wavelength light emitting panel, is driven by a microprocessor based controller. The microprocessor incorporates a software component coded to output all wavelengths of light available within the limits of said microprocessor and the display capabilities of said panel. A user interface and video display is provided to scroll through any or all of said available colors, shapes, or shades and "lock in" the color of choice—thereby creating a customized combined light source and filter. A color mixing, light collimating, or light condensing lens may also be used to modify the light output from said panel in the optical path of a microscope.

Another embodiment of the present invention, specifically intended for use in fluorescence microscopy, combines two of the aforementioned panel/lens/microprocessor units, but configured in a typical fluorescent filter block with a dichroic mirror, wherein one panel set acts as the excitation filter which passes only the wavelength of light necessary for excitation of a fluorophore. The dichroic mirror is the optical element that separates the excitation light from the fluorophore fluorescence. The second panel set acts as the barrier filter to separate fluorescence emanating from the fluorophore from other background light.

The foregoing embodiments, as well as other advantageous features of the embodiments, are explained in more detail with reference to drawings. Therefore, the same or similar reference numbers and components are used, as far as possible, to refer to the same or similar elements in all drawing figures.

DETAILED DESCRIPTION OF THE INVENTION

Figure 1:
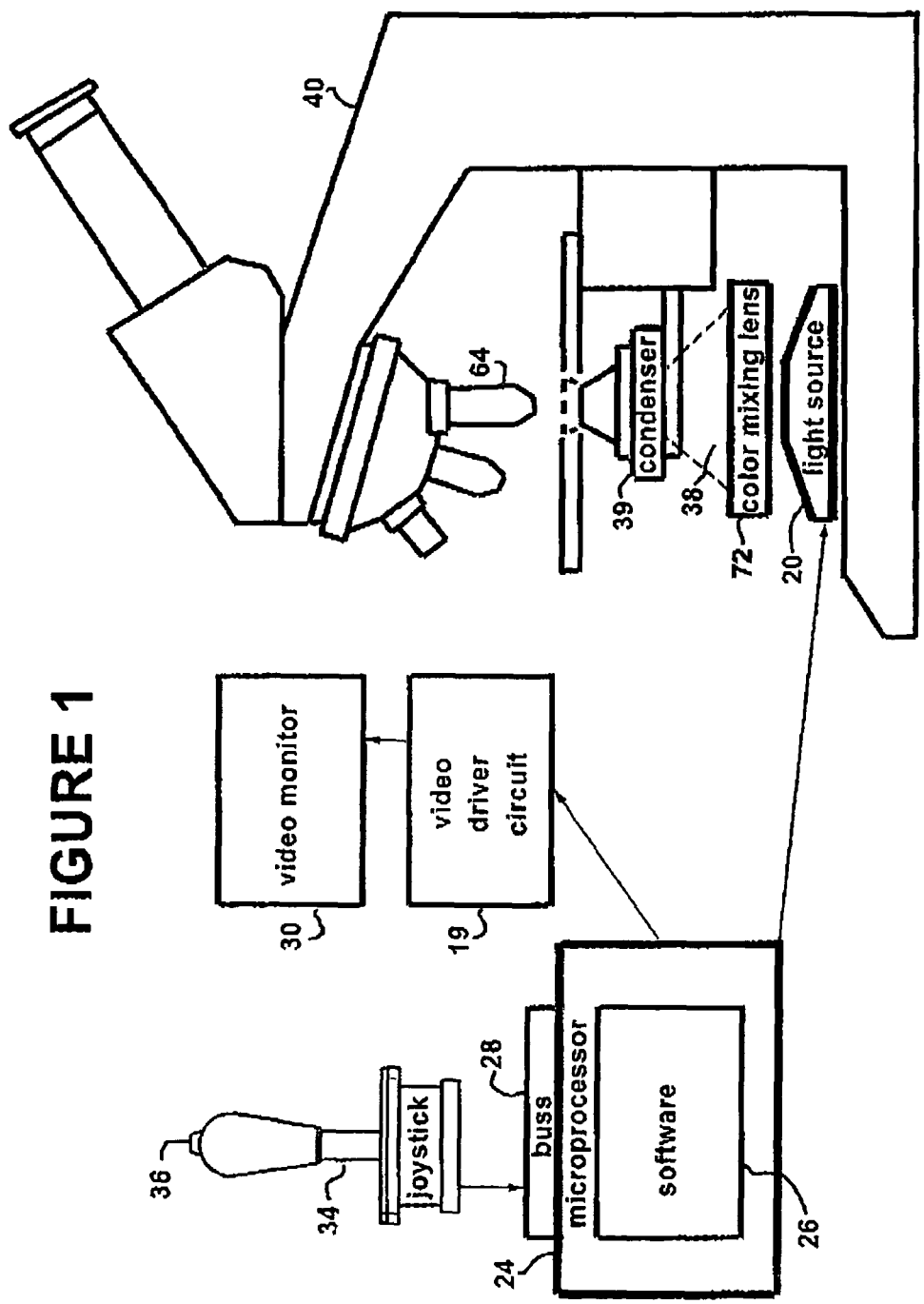
FIG. 1 is a system flow chart of the present invention using one active panel.

The preferred embodiment of the present invention as displayed in the system design flow chart in FIG. 1 incorporates an RGB (red, green, blue) or RGBW (red, green, blue, and white) LED (light emitting diode) light source, a multi-color laser light source, or a substantially functionally equivalent variable color, variable wavelength first light emitting light source panel 20. For example, said panel 20 may be a Luminus Devices SBT or PT series product, a Sony RGB Projection Laser system, a Laser Light Engines product, or a similar device using light producing elements capable of being controlled to output a wide range of colors or wavelengths of light. Said panel 20 is electrically interfaced to a microprocessor module 24.

Software program 26 is incorporated into module 24, either as firmware, or as updateable software code through a USB or equivalent buss 28. Program 26 is configured to enable said module 24 to control said panel 20 to provide visible or invisible colors, or any wavelengths of light which said panel 20 is capable of producing.

A video monitor 30, which may be a typical compact LCD or equivalent, black and white or color display of the type commonly used in computer monitors, laptop computers, or cellular phones, is electrically interfaced to a video driver circuit 19, which is in turn electrically interfaced to, and controlled by module 24. User interface 34 can be a mouse, joystick, or any other device which is interfaced to module 24 through buss 28 to enable selection of a wavelength of light or color in module 24, the code for which is integrated into program 26, and said wavelength of light or color being presented to a user on said display 30.

User interface 34 incorporates at least one simple switch or button 36 to "lock in" said wavelength of light or color selection in said program 26 for purposes of output by said panel 20 and display on said monitor 30. Module 24 may provide video signals to circuit 19 so that the image and colors shown to a user are either different, or substantially identical on display 30 and panel 20.

Light path guide 38 can be an air space, mirrors, a simple hollow coupler, a fiber optic cable, or any other means capable of conducting the light output of panel 20 toward an objective lens 64 in a viewing device 40. Light guide 38 may or may not incorporate a first color mixing lens 72, or a condensing or collimating lens 39. Device 40 in most cases will be a microscope, but can also be any other device which can benefit from the use of filtered light.

Figure 2:
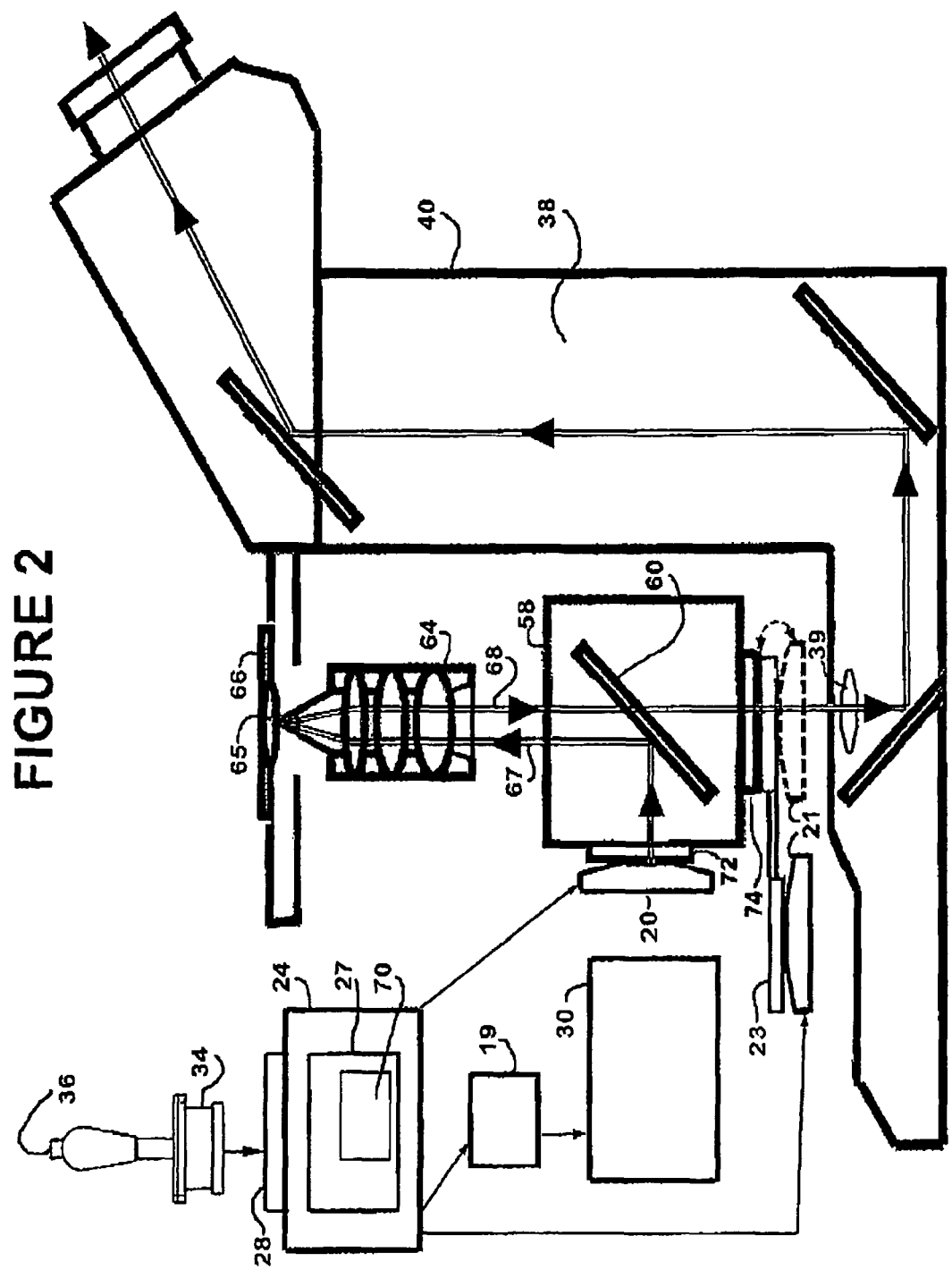
FIG. 2 is a system flow chart of the present invention as a fluorescent filter block.

In the preferred embodiment of the present invention as displayed in FIG. 2, panel 20 is mounted to a panel carder 58. Said first color mixing lens 72 may be mounted between panel 20 and said carder 58. In certain cases, for a certain panel 20, lens 72 may not be necessary. A second panel 21, substantially equivalent in function to panel 20, is also mechanically coupled to carrier 58 such that its light output is applied at an angle to said panel 20. In order to provide this function, panel 21 may first need to be coupled to a translucent light guide 23 to allow said light output placement in the correct angle and location on said carrier 58.

A second color mixing lens 74 may be mounted in between said panel 21 and light guide 23, or in between said light guide 23 and carrier 58. Lens 74 is shown in solid and dotted lines in FIG. 2 to indicate the two possible locations. In certain cases, with certain types of panels 21, said color mixing lens 74 may not be necessary. Said guide 23 may be a fiber optic or other light transmitting translucent panel capable of being side lighted or otherwise illuminated by panel 21 to allow the light that is output from said panel 20 to also pass through said guide 23. In certain cases, with certain types of panels 21, guide 23 may not be necessary, and panel 21 may be amounted directly to said carrier 58. A dotted arc line with arrowheads indicates a variation of panel 21 mounting.

Dichroic mirror 60 is also mounted to carrier 58 at an angle such that light emitted by panel 20 can pass through dichroic mirror 60 and panel 21, or guide 23, to exit carrier 58 toward light guide 38, which can be a simple hollow coupler, mirrors, a fiber optic cable, a color mixing lens, or any other means to direct the light output of panels 20 and 21 toward a viewing device 40—which may be any kind of microscope or other device which can benefit from the present invention.

For ease of understanding and illustration, schematic microscopes are used in FIGS. 1 and 2 provided herein where a viewing device 40 is designated by number.

In this FIG. 2 embodiment, an intended primary usage is in fluorescence microscopy, wherein excitation light signal 67 passing through carrier 58 may be directed by dichroic mirror 60 to pass through an objective lens 64 and strike a fluorophore 65 in a specimen 66, causing said fluorophore 65 to fluoresce and provide a return light signal 68 that travels back through objective lens 64 and on through light path guide 38 to be viewed by a user.

In this FIG. 2 embodiment, panel 20, controlled by module 24, acts as an excitation filter which passes only the wavelength of light necessary for excitation light signal 67 to a specific fluorophore 65. The dichroic mirror 60 is the optical element that separates the excitation light from the fluorescence return light signal 68. Panel 21 is electrically interfaced to, and also controlled by module 24. Panel 21, or panel 21 in conjunction with guide 23, acts as the barrier filter to separate fluorescence emanating from the fluorophore 65 from other background light.

In this FIG. 2 embodiment, software program 27 incorporates all the capabilities of software program 26, but with the added functionality of using fluorescence filter lookup table 70 to automatically choose the wavelength of light or color displayed on said panel 21 in response to a user selection of the wavelength of light or color applied to, and displayed by, said panel 20. Excitation and barrier filter combination lookup table 70 will incorporate substantially all known existing art data regarding excitation and barrier filter combinations so as to optimize this embodiment. Because of the flexibility of module 24 through buss 28, software program 27 may be updated at any time to incorporate and take advantage of new understandings of fluorescent light filter wavelength interactions.

The dichroic mirror 60 is the optical element that separates the excitation light 67 from light source panel 20 from the fluorescence return light 68. Dichroic mirrors are special mirrors that reflect only a specific wavelength of light and are well known in prior art. They allow all other wavelengths to pass through. Dichroic mirrors used in fluorescence microscope filter blocks are typically placed in a forty-five degree incidence angle to light, creating a "stop band" of reflected light and a "pass band" of transmitted light. Light passing through said excitation filter may be reflected ninety degrees toward an objective lens 64 and a specimen containing a fluorophore 65. Light emanating from a fluorophore 65 is then passed through and directed toward the optical output of a microscope. The lookup table software 70 may incorporate a virtually unlimited range of excitation/barrier filter combinations.

Barrier filters are optical elements that separate fluorescence emanating from a fluorophore 65 from other background light. A barrier filter panel 21/guide 23 combination may transmit light of the fluorescence wavelength which passes through the dichroic mirror 60 while blocking all other light leaking from the excitation lamp light source panel 20—reflected from the specimen or optical elements. This is necessary because the strength of the fluorescent light from a fluorophore is weaker than the excitation light by a factor that can exceed 100,000:1. As shown in FIG. 2, the software program 27 includes fluorescent filter optimizing look-up tables 70 which may incorporate all variables currently known, and those that may be later discovered, that apply to excitation and barrier filter combinations.

Software programs 26 and 27 incorporate "color picker" software to output all wavelengths of light or color combinations available within the limits of said module 24 and said panels 20 and 21. User interface 34 is provided to scroll through any or all of said available wavelength of light or colors and use button 36 to "lock in" the wavelength of light or colors of choice.

A video monitor 30, which may be a typical compact LCD or equivalent, black and white or color display of the type commonly used in computer monitors, laptop computers, or cellular phones, is electrically interfaced to a video driver circuit 19, which is in turn electrically interfaced to, and controlled by module 24. User interface 34 can be a mouse, joystick, or any other device which is interfaced to module 24 through buss 28 to enable selection of a wavelength of light or color in module 24, the code for which is integrated into program 26, and said wavelength of light or color being presented to a user on said display 30.

User interface 34 incorporates at least one simple switch or button 36 to "lock in" said wavelength of light or color selection in said program 27 for purposes of display on said panel 20 and said monitor 30. Module 24 may provide video signals to circuit 19 so that the image and colors shown to a user are different, or substantially identical on display 30 and panel 20.

Light path guide 38 can be an air space, mirrors, a simple hollow coupler, a fiber optic cable, or any other means capable of conducting the light output of panel 20 toward an objective lens 64 in a viewing device 40. Light guide 38 may or may not incorporate a collimating lens 39. Device 40 in most cases will be a microscope, but can also be any other device which can benefit from the use of filtered light.

Many of the components incorporated into the present invention such as microprocessors, video monitors, input devices and color generation software packages are in such widespread use that it is not necessary to detail them herein. It is hereby noted that the disclosed embodiments of the present invention herein do not necessarily exhibit all of the advantages of the present invention.

What is claimed is:

1. An active microscope light filtering system comprising:
    at least one first light source capable of generating a range of visible or non-visible wavelengths of light, wherein said at least one first light source is configured to act as an excitation filter which produces only a wavelength of light necessary for the excitation of a fluorophore in a specimen of a microscope;
    at least one dichroic mirror;
    at least one second light source capable of generating a range of visible or non-visible wavelengths of light, wherein said at least one second light source is configured to act as a barrier filter to separate said fluorescense emanating from said fluorophore from other background light;
    at least one carrier configured to contain said at least one first light source, said at least one second light source, and said at least one dichroic mirror;
    at least one microprocessor;
    said at least one microprocessor including at least one software component coded to output wavelengths of light and colors available within the limits of said at least one first light source and said at least one second light source;
    at least one user interface coupled to said at least one microprocessor which allows a user to select any wavelengths of light for output by said at least one first light source and said at least one second light source.

2. The active microscope light filtering system according to claim 1 that incorporates at least one color mixing lens.

3. The active microscope light filtering system according to claim 1 that incorporates at least one lookup table to enable said software to automatically configure said at least one second light source as a barrier filter with respect to an excitation filter wavelength applied to said at least one first light source.

4. The active light filtering system according to claim 1 that incorporates at least one video display.

\* \* \* \* \*